May 8, 1928.  
T. J. WOJNOWSKI ET AL  
1,669,273  
TUBULAR SAW  
Filed Oct. 9, 1926

Inventors.  
T. J. Wojnowski  
J. Jachtyl  
By B. Pelechowiz  
Atty.

Patented May 8, 1928.

1,669,273

UNITED STATES PATENT OFFICE.

TYTUS JAN WOJNOWSKI, OF MACOMB, ILLINOIS, AND JAN JACHTYL, OF KOSCIUSZKO, TEXAS.

TUBULAR SAW.

Application filed October 9, 1926. Serial No. 140,449.

This invention relates to tubular saws, its principal object being the provision of a circular saw for cutting disks or the like.

Another object of the invention is the provision of a saw adapted for manual operation.

A further object of the invention is the provision of a saw provided with pivotal means which are adapted to be driven into the wood or other object to be cut, and around which the saw may be rotated by manual actuation for cutting disks or the like.

With the above general objects in view and others that will appear as the nature of the invention is better understood, the same consists in the novel construction, combination and arrangement of parts hereinafter more fully described, illustrated in the accompaying drawing and pointed out in the appended claim.

Figure 1:
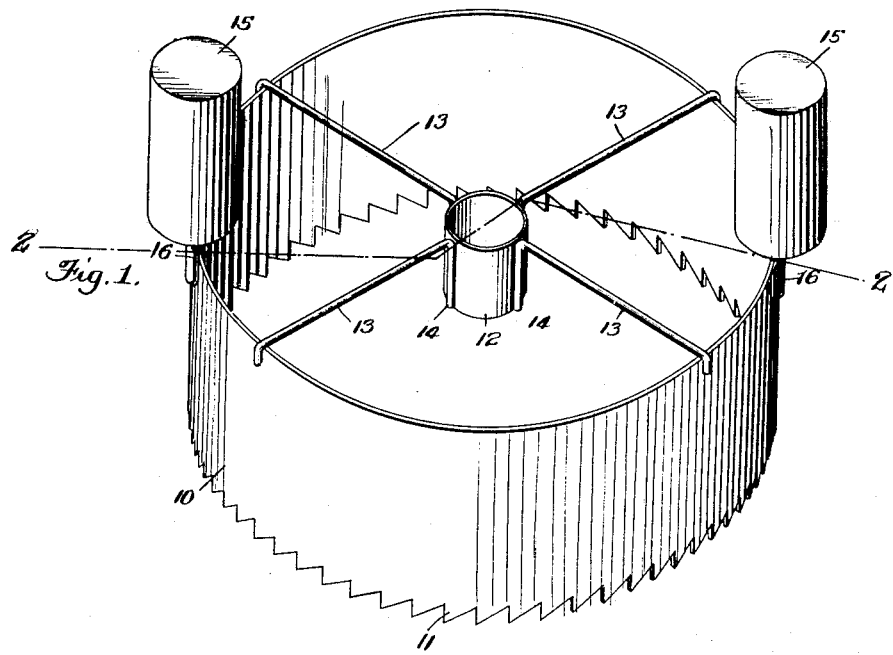
Figure 3:
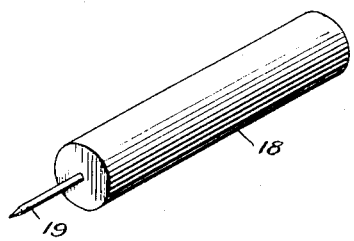
Figure 2:
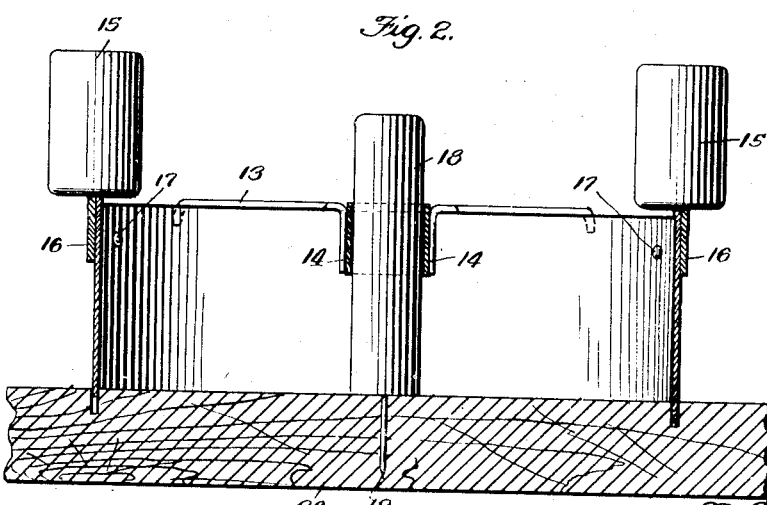

In the drawing forming a part of this application and in which like designating characters refer to corresponding parts throughout the several views, Fig. 1 is the perspective view of the saw;

Figure 2 is a sectional view in a vertical plane taken on the line 2—2 of Figure 1, and shows the retaining means for the handles, the saw per se, and the object to be cut in section; the centering device and handles being shown in full-line profile, and Fig. 3 is the perspective view of the pivotal block constituting the mounting means for the saw while in its operative position.

Referring in detail to the drawing, there is shown therein saw 10 formed in a circular band, adapting the same for cutting disks and the like. At its lower end the saw is provided with cutting edge 11.

Substantially on the plane passing through the upper end of the saw and concentrically disposed therein is an annular band or ring 12 for the purposes hereinafter stated. Said ring 12 is supported and mounted by a plurality of spokes or spider rods 13, which by their outer ends are affixed to the upper edge of the saw, and by their inner or central ends are rigidly affixed to said ring 12, as at 14.

At the upper end the saw 10 is provided with a pair of handles 15 which are positioned and affixed to the saw at two points which are diametrically opposite each other, for providing means for manual rotation of the saw. Said handles 15 at their lower ends carry arcuate plates 16 which are adapted to fit the periphery of the circular saw 10 and which are riveted or otherwise suitably affixed to the saw as at 17.

The device further embodies a centering device comprising a round block 18 which at its lower end is provided with pin 19 which is adapted to be driven into the wood in which disks are intended to be cut by the saw herein disclosed.

Fig. 2 illustrates the operative position of the saw, showing said block 18 in operative association with board 20. It will be apparent that said block 18 remains stationary in its operative position by virtue of the fact that pin 19 remains driven in the board 20, thus preventing any lateral shifting movement of said block 18. The saw is adapted for rotation around said block 18, said band 12 being positioned around said block 18. By manual actuation of said handles 15 the saw may be rotated around said block 18, which provides an axis for the saw, and by exerting a downward pressure upon the saw the teeth are caused to cut the wood or any other material, thus making a round disk in said material as is apparent.

It is of course understood that by making minor changes in the device it may be driven by machine or other motive power instead of being manually operated.

While there is described herein a preferred embodiment of the present invention, it is nevertheless to be understood that minor changes may be made therein, without departing from the spirit and scope of the invention as claimed.

What we claim as new is:

In a tubular saw, a hollow cylindrical hub member open at both ends and coincident with the axis of rotation of the saw, a plurality of rods, each rod having its respective ends bent at right angles to the body of the rod, one of the ends of each of the rods connected with the outside of the hub member and the other ends of the rods engaged over and connected with the top edge of the saw, and a centering device for the saw having a smooth, elongated, cylindrical body portion adapted to be freely slipped into the hubmember to pivotally retain the same, and a pin carried by the body portion to engage the work to retain and position the centering device.

In testimony whereof we affix our signatures.

TYTUS JAN WOJNOWSKI.
JAN JACHTYL.